June 10, 1930. G. J. MEYER 1,763,005
LOAD REDUCING MEANS FOR CONVEYERS
Filed Aug. 21, 1929
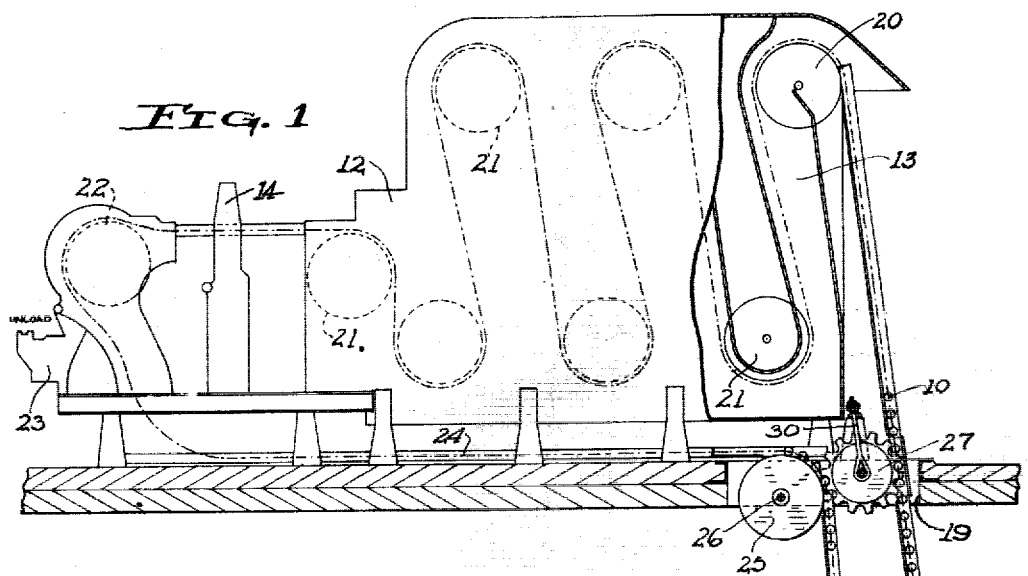
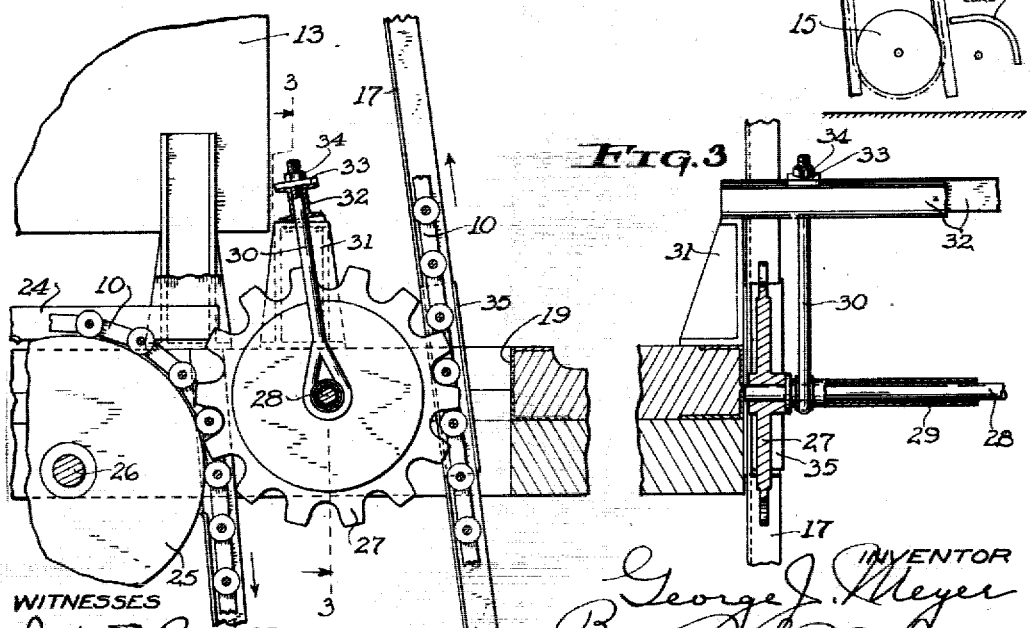
INVENTOR
George J. Meyer
By R. S. Caldwell
ATTORNEY
WITNESSES
Irving J. Rose
M. E. Downey Patented June 10, 1930

1,763,005

UNITED STATES PATENT OFFICE

GEORGE J. MEYER, OF MILWAUKEE, WISCONSIN, ASSIGNOR TO GEO. J. MEYER MANUFACTURING COMPANY, OF CUDAHY, WISCONSIN, A CORPORATION OF WISCONSIN

LOAD-REDUCING MEANS FOR CONVEYERS

Application filed August 21, 1929. Serial No. 387,477.

The invention relates to load reducing means for conveyers.

In certain machines embodying conveyers it is necessary to lift heavy loads over a considerable distance, as from one floor to another. In a machine of this type, a considerable friction load is imposed on the bearings of the rotary member on which the ascending load-carrying conveyer flight is supported at its upper end, and when the conveyer is required to be impelled around a number of succeeding rotary members, the friction load on the bearings of these members is increased by reason of the friction load on the first-named bearings. The weight of the downwardly moving conveyer flight places a considerable friction load on the bearings of the rotary member over which it last passes, which retards the descent, and if this strain is transmitted to the bearings of other rotary members, the friction load is substantially increased. The total friction load on the machine may therefore become unduly large, with the result that relatively rapid wear will occur and an excessive amount of power will be required to drive the machine.

It is an object of the present invention to provide means for minimizing this friction load and more specifically to provide rotary means engaging and suspending both ascending and descending conveyer flights to substantially balance the suspended loads and to materially reduce the dead loads on these conveyer flights.

Another object of the invention is to provide a conveyer system including an adjustably-mounted sprocket wheel engaging and suspending both ascending and descending flights of conveyer chain.

The invention further consists in the several features hereinafter set forth and more particularly defined by the annexed claims.

In the accompanying drawings, Fig. 1 is a side elevation of a bottle-handling machine embodying the load reducing means of this invention, parts being broken away and parts being shown in section;

Fig. 2 is a detail sectional elevation showing the balancing sprocket wheel and its connection with the chain conveyer, and Fig. 3 is a detail sectional view taken along the line 3—3 of Fig. 2.

In these drawings, the numeral 10 designates one of a pair of spaced endless conveyer chains of the roller type forming the side portions of a suitable conveyer 11. By way of example, this conveyer is shown to be a bottle conveyer incorporated in a bottle-handling machine 12, here indicated to be a combined soaking and washing machine including a soaking tank 13 and washing mechanism 14. In some installations, it has been found desirable to place the bottle-cleaning machine on one floor and to extend the bottle conveyer to an adjacent floor for loading or unloading purposes. In the present instance, adjacent ascending and descending flights of the bottle conveyer are extended to the floor below to pass about a rotary member 15, and a bottle loading device 16 is placed adjacent the lower end of the ascending flight of the conveyer. The conveyer chains of the ascending flight are guided along angle tracks 17, and the conveyer chains of the descending flight are guided along angle tracks 18, the ascending and descending conveyer flights passing through an opening 19 in the floor which supports the bottle-cleaning machine. The upper ends of the angle tracks 17 terminate at the soaking tank adjacent a rotary member 20 which forms a support for the upper end of the ascending conveyer flight. The conveyer chains pass over the rotary member 20 and into the soaking tank and are movable in a sinuous path through the soaking tank, the chains being supported for such movement by passing over a number of rotary members 21. After leaving the soaking tank 13, the bottle conveyer passes in a horizontal flight past the washing apparatus 14 where the bottles are brushed and subjected to washing and rinsing sprays in a well-known manner. After leaving the washing apparatus, the conveyer passes over a rotary supporting member 22, and then passes an unloading device 23 of suitable construction where the cleaned bottles are unloaded from the conveyer. The empty conveyer then descends to a pair of angle tracks 24 along which the conveyer chains are guided for horizontal movement to a pair of guide wheels or sheave wheels 25 (one being shown) extending into the floor opening 19 and carried on a shaft 26. The conveyer chains pass over the wheels 25 and then travel in a descending flight along the angle tracks 18 heretofore noted. The conveyer may be driven by any suitable impelling means, as commonly provided in bottle-cleaning machines.

A pair of axially spaced sprocket wheels 27 (one being shown) are disposed in the floor opening 19 to engage the rollers of the adjacent ascending and descending flights of the conveyer chains. The sprocket wheels are carried on a transversely-extending shaft 28 which is journalled in suitable anti-friction bearings at the end portions of a surrounding tube 29, the tube being suspended near its ends on eye-bolts 30. Floor pedestals 31 at opposite sides of the floor opening 19 carry a pair of spaced transversely-extending channel members 32 thereabove between which the eye-bolts 30 pass, each eye-bolt also passing through a supporting plate 33 resting on the upper faces of the channels. A nut 34 threaded on each eye-bolt 30 bears on the supporting plate 33 and is capable of adjustment to vary the elevation of the sprocket wheels 27. The wheels 25 serve to retain the chain rollers between the teeth of the sprocket wheels at one side of the sprocket wheels, and at the other side the chain is retained in mesh with the sprocket wheels by the flanges of angle plates 35 secured to the angle tracks 17.

The sprocket wheels 27 support therefrom all the weight of the conveyer and its contents disposed below the sprocket wheels, thereby relieving the bearings of the rotary supports 20 and 25, as well as the bearings of the other rotary members in the cleaning machine, from an excessive friction load. The weight of the descending flight of the conveyer suspended from the sprocket wheels 27 is substantially the same as the weight of the ascending flight of the conveyer disposed below the sprocket wheels, (except for the weight of the bottles in the ascending flight), thereby approximately balancing the weight suspended from opposite sides of the sprocket wheels. The sprocket wheels can be readily adjusted by their suspension eye-bolts to compensate for wear and stretch in the conveyer chains.

By means of this invention, it is possible to materially reduce the friction load and bearing pressures on the bearings of the conveyer-supporting members and thus not only reduce wear but also effect substantial economies in power consumption. While the application of the invention has been exemplified in a bottle-cleaning machine, it will be obvious that the invention can be used in any type of machine in which similar conditions are encountered.

What I claim as new and desire to secure by Letters Patent is:

1. In a machine having a conveyer including ascending and descending flights and rotary supporting means for the upper portions of said conveyer flights, the combination, with said conveyer, of a rotary member engaging at its opposite sides the ascending and descending flights and supporting the lower portions of said flights therefrom to minimize the friction load on said rotary supporting means.

2. In a machine having a conveyer including ascending and descending flights and rotary supporting means for the upper portions of said conveyer flights, the combination, with said conveyer, of a rotary member engaging at its opposite sides the ascending and descending flights and supporting the lower portions of said flights therefrom to minimize the friction load on said rotary supporting means, and means for adjustably elevating said rotary member.

3. In a machine having a chain conveyer including ascending and descending flights and rotary supporting means for the upper portions of said conveyer flights, the combination, with said conveyer, of a rotatably mounted sprocket wheel engaging at its opposite sides the chain of said ascending and descending flights and supporting the lower portions of said flights therefrom to minimize the friction load on said rotary supporting means.

4. In a machine having a conveyer including ascending and descending flights and rotary supporting means for the upper portions of said conveyer flights, the combination, with said conveyer, of rotatably mounted supporting means engaging both said ascending and descending flights for supporting and suspending the lower portions of said flights therefrom to minimize the friction load on said rotary supporting means.

5. In a machine having a chain conveyer including ascending and descending flights and rotary supporting means for the upper portions of said conveyer flights, the combination, with said conveyer, of guide tracks along which the conveyer chain of said flight passes, a sprocket wheel engaging at its opposite sides the chain of said ascending and descending flights, guide means for confining the chain in engagement with said sprocket wheel, and means for supporting said sprocket wheel to cause said sprocket wheel to assume the weight of the lower portions of said conveyer flights to thereby minimize the friction load on said rotary supporting means.

6. In a machine having a chain conveyer including ascending and descending flights and rotary supporting means for the upper portions of said conveyer flights, the combination, with said conveyer, of guide tracks along which the conveyer chain of said flight passes, a sprocket wheel engaging at its opposite sides the chain in said ascending and descending flights, guide means for confining said chain in engagement with said sprocket wheel, a shaft on which said sprocket wheel is mounted, a bearing member in which said shaft is journalled, a suspension member engaging said bearing member, a transversely-extending supporting member receiving said suspension member therein, and means for longitudinally displacing said suspension member for adjustably elevating said sprocket wheel to cause said sprocket wheel to assume the weight of the lower portions of said conveyer flights to thereby minimize the friction load on said rotary supporting means.

7. The combination of a bottle cleaning machine having an endless bottle conveyer including a chain and there being rotary members supporting said chain, said conveyer including a portion extended downwardly from said machine to a bottle-transferring station, and said downwardly extended portion of the conveyer including ascending and descending flights supported at their upper portions on said rotary members, and sprocket wheel suspension means engaging the chain of both said ascending and descending conveyer flights for approximately balancing the loads therebelow and for reducing the friction load on said rotary supporting members.

In testimony whereof I affix my signature.

GEORGE J. MEYER.